United States Patent
Jitaru et al.

(10) Patent No.: US 9,899,929 B2
(45) Date of Patent: Feb. 20, 2018

(54) SOFT TRANSITION ON ALL SWITCHING ELEMENTS TWO TRANSISTORS FORWARD CONVERTER

(71) Applicant: Rompower Energy Systems, Inc., Tucson, AZ (US)

(72) Inventors: Ionel Jitaru, Tucson, AZ (US); Marco Antonio Davila, Tucson, AZ (US)

(73) Assignee: ROMPOWER ENERGY SYSTEMS, INC., Tucson, AZ (US)

( * ) Notice: Subject to any disclaimer, the term of this patent is extended or adjusted under 35 U.S.C. 154(b) by 0 days.

(21) Appl. No.: 14/890,088

(22) PCT Filed: May 12, 2014

(86) PCT No.: PCT/US2014/037736
§ 371 (c)(1),
(2) Date: Nov. 9, 2015

(87) PCT Pub. No.: WO2014/183132
PCT Pub. Date: Nov. 13, 2014

(65) Prior Publication Data
US 2016/0094137 A1    Mar. 31, 2016

Related U.S. Application Data

(60) Provisional application No. 61/821,902, filed on May 10, 2013.

(51) Int. Cl.
*H02M 3/335* (2006.01)
*H02M 1/00* (2006.01)

(52) U.S. Cl.
CPC ..... *H02M 3/33592* (2013.01); *H02M 3/3353* (2013.01); *H02M 3/33553* (2013.01);
(Continued)

(58) Field of Classification Search
CPC .. H02M 1/08; H02M 3/3353; H02M 3/33546; H02M 3/33592
(Continued)

(56) References Cited

U.S. PATENT DOCUMENTS 5,274,543 A    12/1993   Loftus, Jr.
5,991,167 A    11/1999   Van Lerberghe
(Continued)

*Primary Examiner* — Jeffrey Sterrett
(74) *Attorney, Agent, or Firm* — Yakov S. Sidorin; Quarles & Brady LLP

(57) ABSTRACT

A method is shown to improve any forward topology operation to achieve efficient resonant transitions by actively shorting the magnetizing inductance and release the short at another time thus producing lower switching losses independent of frequency. In another embodiment of this invention the current from the output inductor is allowed to go negative before the freewheeling synchronous rectifier is turned off, pushing the current back into the primary to create a soft transition across the switching elements before they are turned on. In another embodiment of the invention a current source is used to inject a negative current through the freewheeling synchronous rectifier before is turned off with the purpose of transferring the current into the primary to discharge the parasitic capacitances of the primary switchers before are turned on. An optimized control method can be utilized to tailor the frequency to create the necessary conditions requested by the embodiments of the invention.

10 Claims, 23 Drawing Sheets

US 9,899,929 B2
Page 2

(52) U.S. Cl.
CPC .. *H02M 2001/0058* (2013.01); *Y02B 70/1433* (2013.01); *Y02B 70/1475* (2013.01); *Y02B 70/1491* (2013.01)

(58) Field of Classification Search
USPC .................... 363/21.02, 21.03, 21.06, 97
See application file for complete search history.

(56) References Cited

U.S. PATENT DOCUMENTS

| | | | | |
|---|---|---|---|---|
| 6,490,177 B1* | 12/2002 | Figueroa | ............... | H02M 3/335 363/131 |
| 7,548,435 B2 | 6/2009 | Mao | | |
| 2005/0226009 A1* | 10/2005 | Jitaru | ............... | H02M 3/28 363/17 |
| 2012/0281436 A1* | 11/2012 | Cuk | ............... | H02M 3/33569 363/21.03 |
| 2014/0157015 A1* | 6/2014 | Zhan | ............... | H02M 1/34 713/320 |
| 2014/0334188 A1* | 11/2014 | Jitaru | ............... | H02M 3/3376 363/16 |
| 2014/0334194 A1* | 11/2014 | Davila | ............... | H02M 3/33576 363/21.02 |
| 2015/0015071 A1* | 1/2015 | Deboy | ............... | H02M 3/335 307/31 |
| 2015/0023063 A1* | 1/2015 | Perreault | ............... | H02M 3/337 363/17 |
| 2016/0020701 A1* | 1/2016 | Jitaru | ............... | H02M 3/33546 363/16 |
| 2016/0094132 A1* | 3/2016 | Davila | ............... | H02M 3/33507 363/21.06 |
| 2016/0094137 A1* | 3/2016 | Jitaru | ............... | H02M 3/3353 363/21.03 |
| 2016/0126853 A1* | 5/2016 | Davila | ............... | H02M 3/33592 363/21.14 |
| 2017/0012547 A1* | 1/2017 | Jitaru | ............... | H02M 3/33592 |
| 2017/0025965 A1* | 1/2017 | Ramabhadran | ... | H02M 3/33546 |

\* cited by examiner (2.a) $Z_C = \sqrt{\dfrac{Lm}{Ceq}}$  (2.b) $\omega = \dfrac{1}{\sqrt{(Lm * Ceq)}}$ (2.c) $\emptyset = \arctan\left(Z_C * \dfrac{Im}{Vr - Vin}\right)$ (2.d) $V_{SW}(t) = Vr - (Vr - Vin)\dfrac{\cos\emptyset - \cos(\emptyset - \omega t)}{\cos\emptyset}$ (2.e) $I_{Lm}(t) = (Vr - Vin)\dfrac{\sin(\emptyset - \omega t)}{Z_C * \cos\emptyset}$ For: Two Transistor Forward Topology
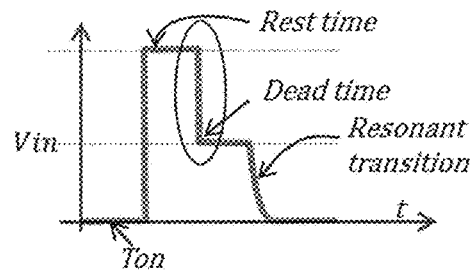
FIGURE 3
(3.a) $Im = 0 \to \emptyset = 0$    (3.b) $Vr = 2Vin$
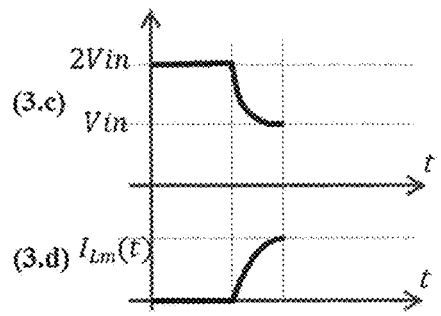
(3.e) $V_{SW}(t) = Vin(1 + \cos\omega t)$
(3.f) $I_{Lm}(t) = \dfrac{Vin}{Zc}\sin\omega t$

SOFT TRANSITION ON ALL SWITCHING ELEMENTS TWO TRANSISTORS FORWARD CONVERTER

RELATED APPLICATION/CLAIM OF PRIORITY

This application is related to and claims priority from U.S. provisional application Ser. No. 61/821,902, filed May 10, 2013, which provisional application is incorporated by reference herein.

INTRODUCTION

The Two Transistor Forward topology is the most popular topology for off line applications. Applications include AC to DC adapters for desktop computers, servers, and many other power applications in medium power levels. The Two Transistor Forward topology is presented in FIG. 1. Two primary switching elements, M1 and M2 and two reset rectifiers D1 and D2 compose it. In the secondary there are two rectifier elements SR1 and SR2. During the conduction of the primary switchers, M1 and M2, the power is transferred to the secondary via SR1 and Lo. During that period of time, there is a forward energy transfer to the secondary. The input voltage Vin is applied across the primary winding. If the polarity of the transformer is as presented in FIG. 1, a positive voltage is reflected in the source of SR1 across the secondary winding. SR1 will start conducting and when the current through SR1 reaches the level of the output current which was flowing at that time through SR2 and Lo, SR2 is turned off and the current through Lo will continue to flow through SR1.

This period of conduction is referred to as a forward energy transfer from the input source Vin to the output load Ro. During the same period of time a magnetizing current will be built up in the transformer. After a period of time, referred to as Ton for M1 and M2, the primary switchers are turned off. At that time the magnetizing current which was built up during the Ton time for M1 and M2 forces the conduction of D1 and D2, starting the reset of the transformer Tr. For a proper reset of the transformer the product of Voltage*time applied to the transformer during Ton of M1 and M2 has to be equal with the product Voltage*time during the conduction of D1 and D2 referred as Reset Time of the transformer. The voltage applied to the transformer during the Ton of M1 and M2 is equal to the voltage applied to the transformer during the conduction of D1 and D2, which is the Reset Time. As a result, the Ton time for M1 and M2 it is equal to Reset Time. During the Reset Time, in the secondary the current is flowing through SR2 and Lo towards the load. In conclusion, during the Ton time of M1 and M2 the energy is transferred to the output via SR1 and Lo, while some of the energy is stored in Lo and the rest transferred to the load. In the same time, energy is built up in the magnetizing current, which is later transfer to the input voltage Vin during the Rest time. After the Reset Time, there is another time interval, which we will call Dead Time, which follows the Reset Time wherein no significant amount of energy is transferred to the load. A Duty Cycle parameter is introduced which is the ration between the Ton Time of M1 and M2 and the period of the repetition frequency. Because the Reset Time and Ton Time have to be equal for the complete reset of the transformer the maximum duty cycle in this topology is 50%.

The Two Transistor Forward topology is presented in FIG. 1. At the end of the Rest Time, there is a voltage across the switching elements, which combined, is Vin, Vin/2 across each switch. The equations which describe the behavior of the equivalent circuit presented in FIG. 2, and referred in this application as Resonant Circuit with Initial Conditions, are presented in FIGS. 2a, b, c, d, and e.

In the case of Two Transistor Forward Topology at the end of the Reset Time, the magnetizing current is zero and the voltage across the combined switching elements is twice the input voltage (see FIG. 3, FIG. 3a and FIG. 3b). The voltage across the combined switching elements is described by the formula presented in FIG. 3e. The magnetizing current behavior is described by the formula 3f. FIGS. 3c, 3d the voltage and current across the combined switching elements, which is mathematically described by the equation in FIG. 3f. The voltage decays from the initial amplitude of 2Vin to Vin in a quasi-resonant transition. In FIG. 3d is depicted the magnetizing current which is built up from zero towards a peak of Vin/Zc. The characteristic impedance Zc is described by FIG. 2a. In conclusion at the end of the Reset Time there is a soft transition wherein the voltage across the combined switchers transition from 2Vin to Vin and the magnetizing, current is built up to Vin/Zc from zero level. When the voltage across the combined switching elements reached Vin, the voltage across the secondary winding reached zero. The resonant transition would continue but when the voltage in the secondary winding changes its polarity SR1 will start conducting, initially through the body diode followed by an active turn on in the gate of SR1. The magnetizing current will be start flowing into the secondary via SR1 and SR2.

This mode of operation characterizes the Two Transistor Forward Topology and we refer to it as prior art. In the Prior Art Two Transistor Forward Topology, after the dead time period, M1 and M2 are turned on while the voltage across them is Vin/2. This mode of operation is called, hard switching turn ON. In the ahead switching Turn On the energy stored in the parasitic capacitance of the switching elements, M1 and M2 and the parasitic capacitance of the transformer is dissipated. In addition to this, there are large current spikes by the forceful discharge of the parasitic capacitance, which created noise in the system. In the Prior Art when the switchers M1 and M2 turn on and a voltage is applied to the transformer primary, and it reflects across the secondary winding, SR2 is in conduction. As a result, a spike of current is produced through SR2 limited by the leakage inductance, phenomenon also known in the field as cross conduction. The cross conduction it is a very dissipative phenomenon which negatively affects the efficiency of the converter. In many applications wherein the efficiency of the power converter it is a major priority the leakage inductance of the transformer is minimized and as a result, the peak current through the SR2 reaches higher level decaying the efficiency. To minimize this in the Prior Art the timing of SR2 is very critical. The SR2 is turns off before M1 and M2 are turned on. However, even after the SR2 is turned off the body diode of SR2 is further conducting forced by the Lo. The cross conduction losses are replaced by the reverse recovery losses associated with the body diode. Function of the reverse recovery characteristics of the body diode of SR2 the losses can be significant, though possible lower then cross conduction losses.

SUMMARY OF THE PRESENT INVENTION

The present invention comprises a method for a forward converter, and is particularly useful with a two transistors forward converter.

According to this invention we are able to eliminate the disadvantages presented in analyzing the prior art. By controlling the timing of the drive signal for SR1 and SR2 we are able to create zero voltage switching conditions for M1 and M2 eliminating the losses associated with the discharge of the parasitic capacitances of M1, M2 and the transformer. In the same time we are able to eliminate not only the cross conduction between M1, M2 and the SR2 but we are able to eliminate also the reverse recovery losses associated with the body diode of SR2. The method used in this invention offers soft transition on the primary switchers and also secondary switchers in application with very low leakage inductance. In most of the application to obtain soft switching on the primary switchers, the transformer has to have a larger leakage inductance and in some cases, additional inductive elements are placed in the primary or the secondary of the transformer.

In one of its features, the method of the invention can improve any forward topology operation to achieve efficient resonant transitions by actively shorting the magnetizing inductance and release the short at another time thus producing lower switching losses independent of frequency. In another aspect of the invention, the current from the output inductor is allowed to go negative before the freewheeling synchronous rectifier is turned off, pushing the current back into the primary to create a soft transition across the switching elements before they are turned on. In another aspect of the invention, a current source is used to inject a negative current through the freewheeling synchronous rectifier before is turned off with the purpose of transferring the current into the primary to discharge the parasitic capacitances of the primary switchers before they are turned on.

The principles of the present invention are reflected in several embodiments.

In one embodiment, the present invention provides a resonant transition control method for a forward converter (e.g. a two transistor forward converter) having a transformer, primary switching elements in a primary and synchronous rectifiers and an output choke (inductor) in a secondary. The invention provides for shorting the secondary winding of the transformer during the natural ring of the transformer, to conserve magnetizing energy stored in the transformer, while the magnetizing current exceeds the choke current prior to the primary turn on, so that the primary switches turn on at 0 or near 0 voltage. In a preferred version adjusting the frequency and turn on duration of the primary switches can be adjusted, so that the foregoing conditions described herein are satisfied for a range of line and load conditions. With converter topologies (e.g. two transistor forward topologies), the range of line and load conditions could be static or dynamically changing, as will be recognized by those in the art.

In another embodiment, the present invention also provides a resonant transition control method for a forward converter (e.g a two transistor forward converter) that has two power trains each of which has a freewheeling rectifier. The method of the invention comprises interleaving the two power trains so that each power train in forward mode provides current to the other power train, so that its freewheeling synchronous rectifier has negative current, to create a negative current through the freewheeling synchronous rectifiers of the converter to minimize the turn on losses.

In yet another embodiment, the invention provides resonant transition control method for a forward converter (e.g. a two transistor forward converter) that comprises utilizes utilizing a current source to inject a current into a synchronous rectifier in the secondary of the converter for the purpose of creating a negative current in the secondary before that synchronous rectifier is turned off.

These and other features of the present invention will be further apparent from the following detailed description and the accompanying drawings.

BRIEF DESCRIPTION OF THE DRAWINGS

FIGS. 3 and 3a-f show the Two Transistor Forward Topology at the end of the Reset Time, where the magnetizing current is zero and the voltage across the combined switching elements is twice the input voltage (see FIG. 3, FIG. 3a and FIG. 3b), where the voltage across the combined switching elements is described by the formula presented in FIG. 3e, the magnetizing current behavior is described by the formula 3f, and FIGS. 3c, 3d show the voltage and current across the combined switching elements, which is mathematically described by the equation in FIG. 3f;

DETAILED DESCRIPTION

As described above, the present invention provides a method for providing a forward converter (e.g. a two transistors forward converter) with lower switching losses. Its principles are described herein in connection with a two transistors forward converter, and from that description the manner in which the present invention can be applied to various forward converters will be apparent to those in the art.

Figure 4:
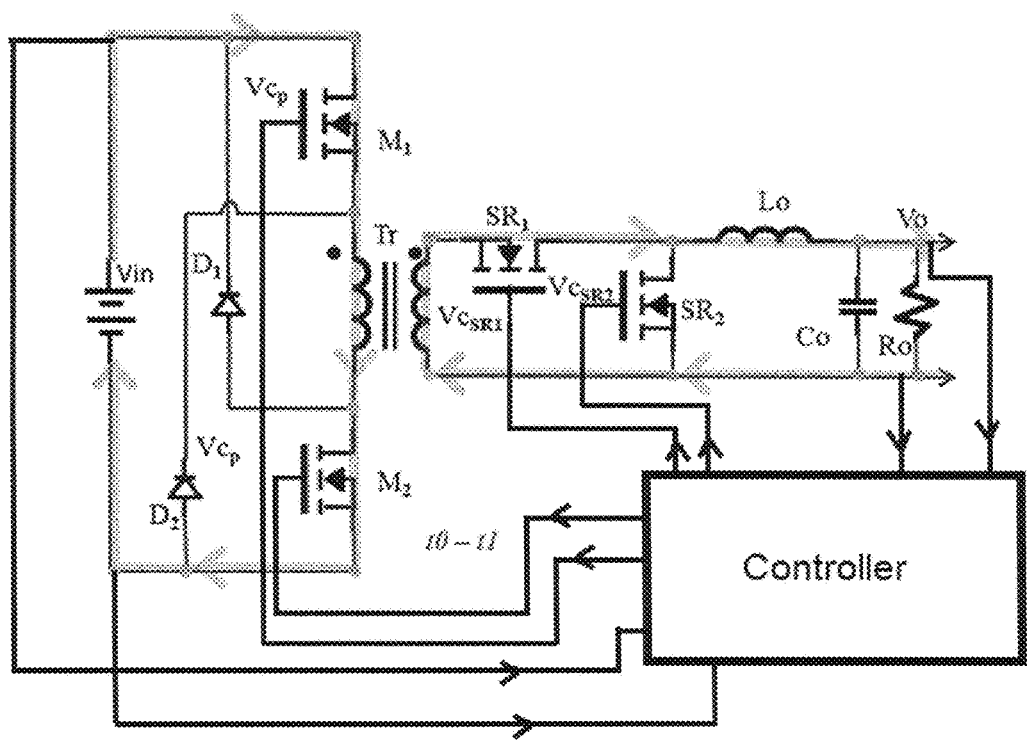
FIGS. 4-11 show the mode of operation of the present invention.
Figure 5:
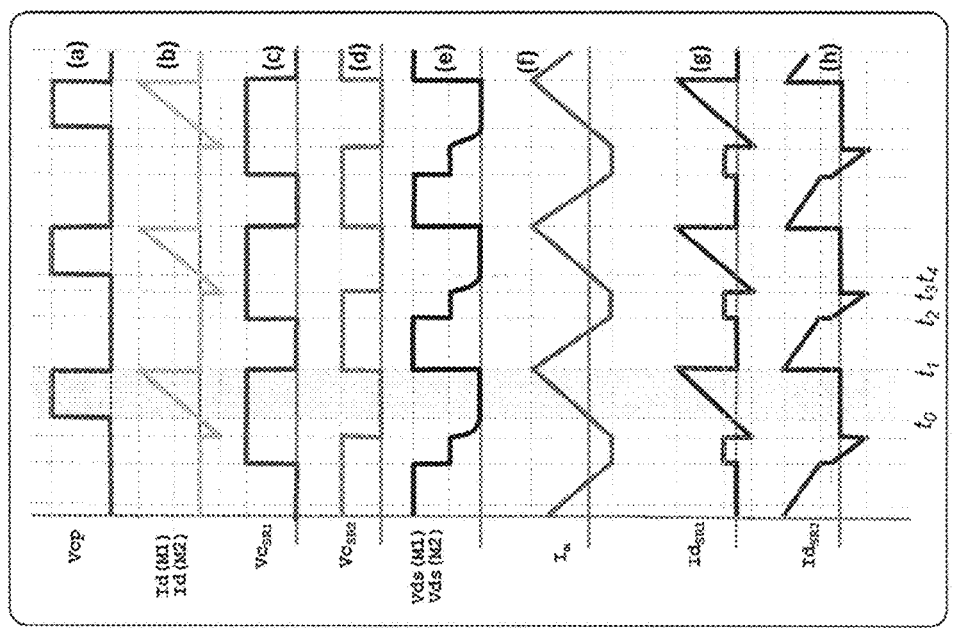

The mode of operation in this invention to an embodiment of a two transistors forward converter is described in FIG. 4, FIG. 5, FIG. 6, FIG. 7, FIG. 8, FIG. 9, FIG. 10 and FIG. 11. In FIG. 5 are depicted the key waveforms, Vcp the drive signal for M1 and M2, the current through M1 and M2, Vcsr1 and Vcsr2 which are the control voltages for SR1 and Sr2, The voltage across the primary switchers in FIG. 5e, The magnetizing current in FIG. 5f, the current through the SR1 and the current through SR2.

We have identified four modes of operation of this embodiment.

To-T1 As is depicted in FIG. 4 during this time M1 and M2 are conducting. The input voltage Vin is applied to the primary winding. In a secondary winding, a voltage is developed with the positive polarity at the dot. The current flows in the secondary via SR1 and Lo towards the load. During this time SR1 is ON. The magnetizing current is built up through the transformer. This is the time interval wherein the energy is transferred to the secondary and in the same time, energy is store in the output inductor Lo.

Figure 6:
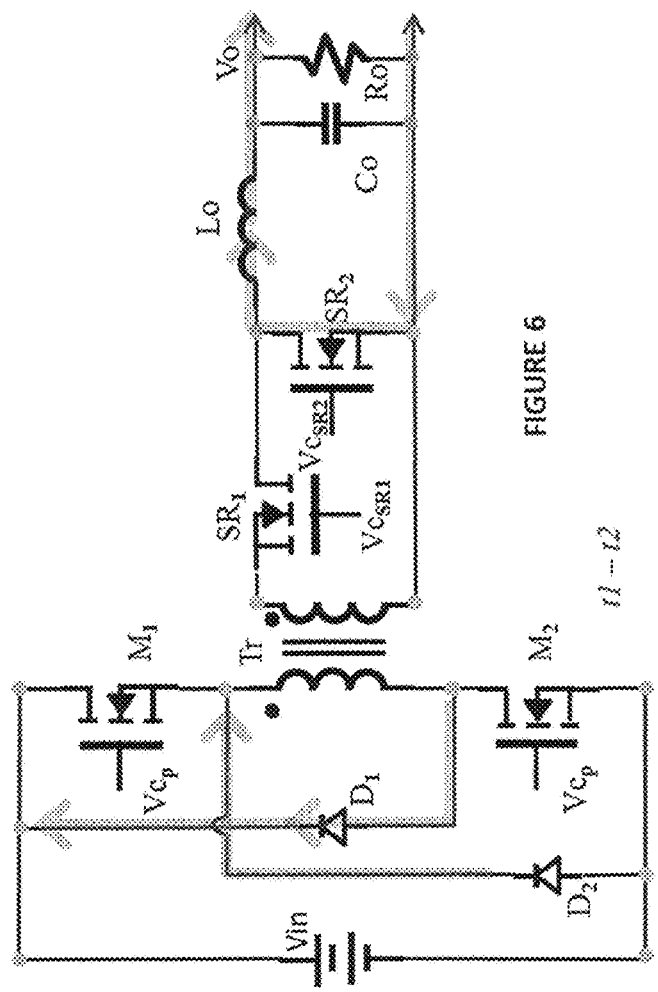
Figure 7:
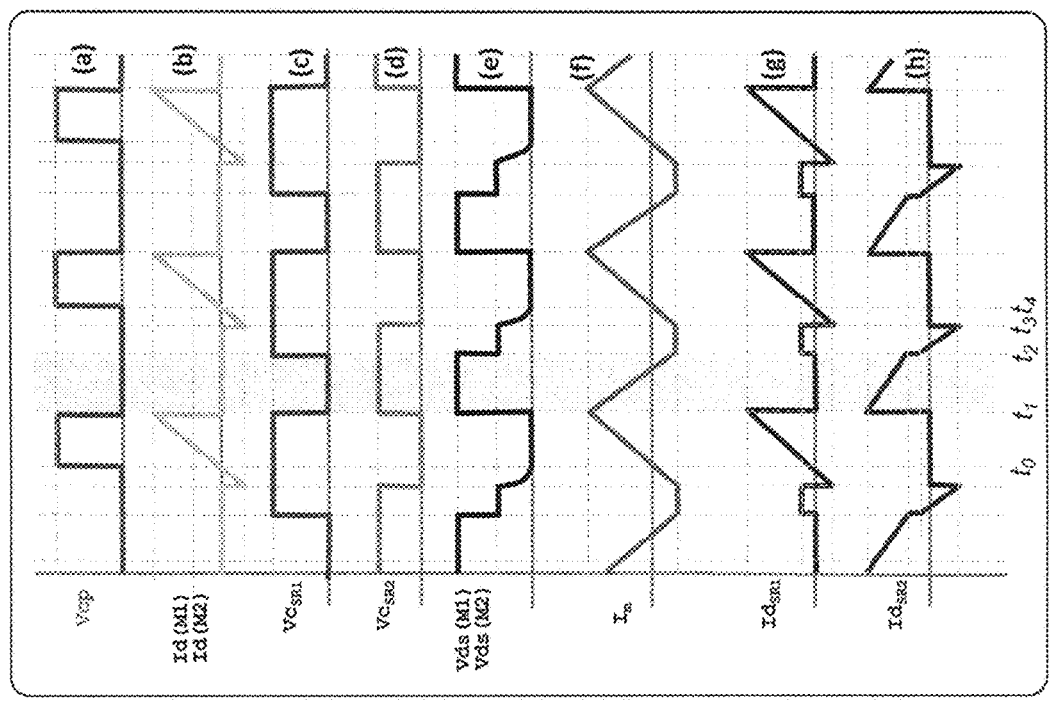
Figure 8:
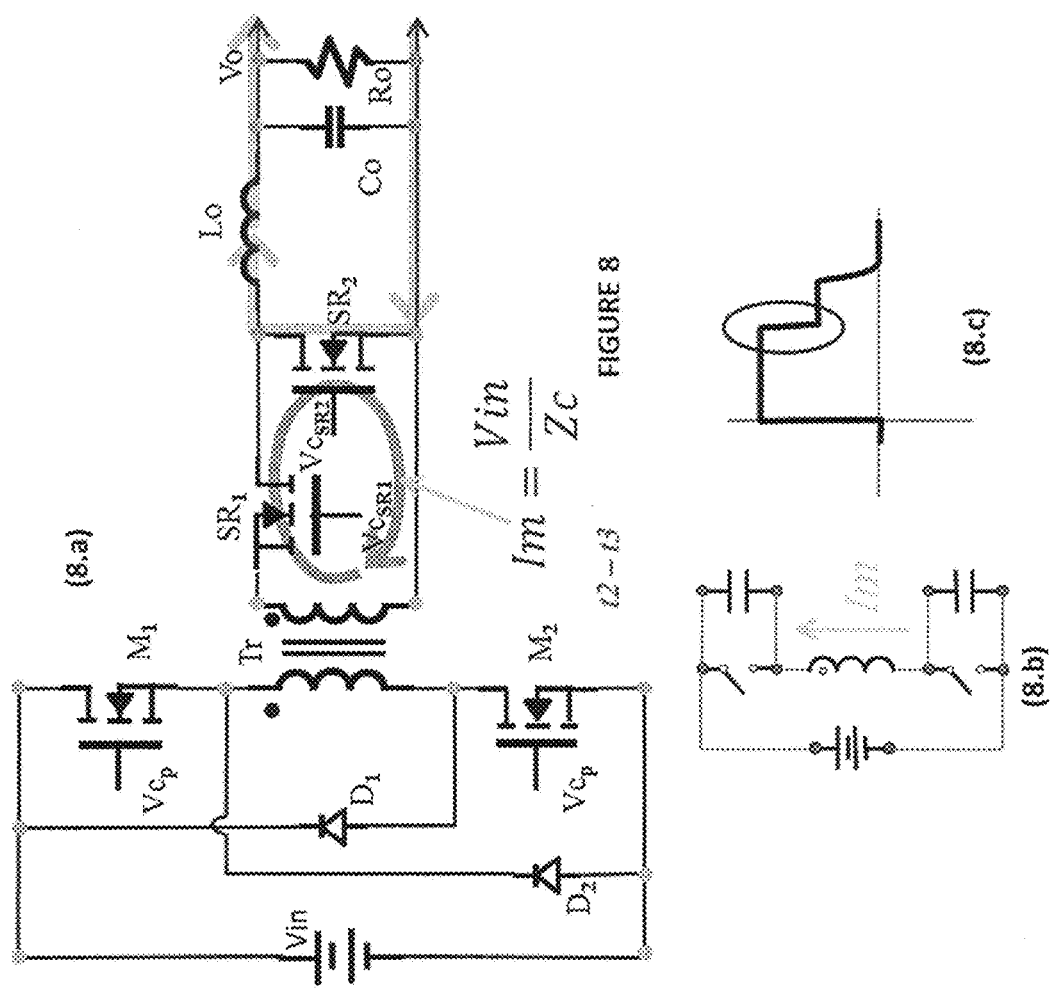
Figure 9:
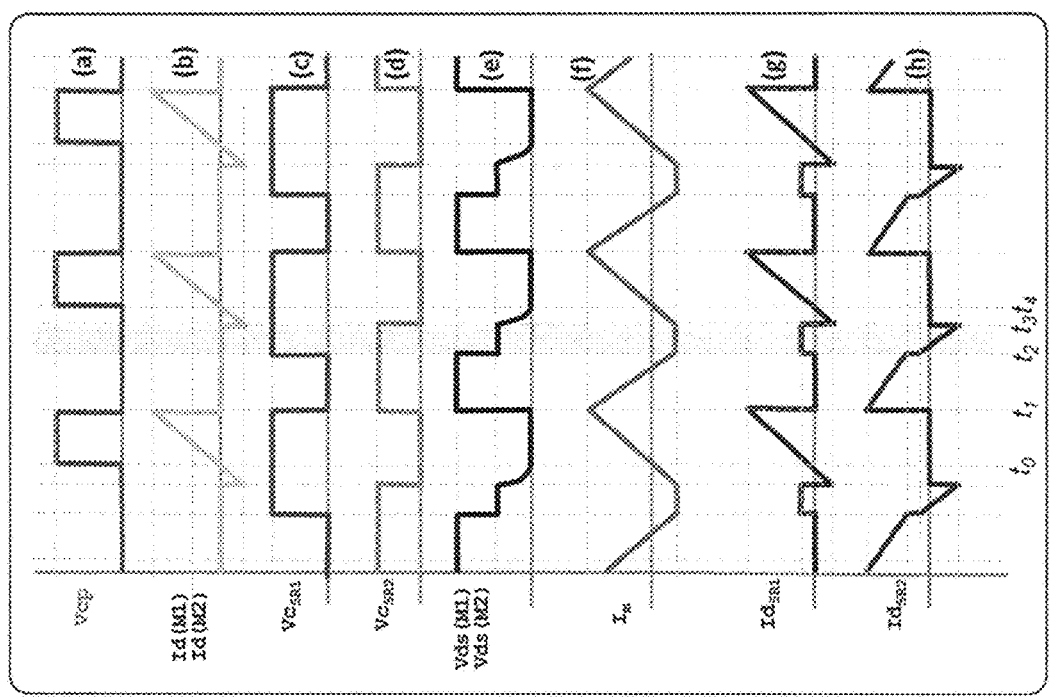
Figure 10:
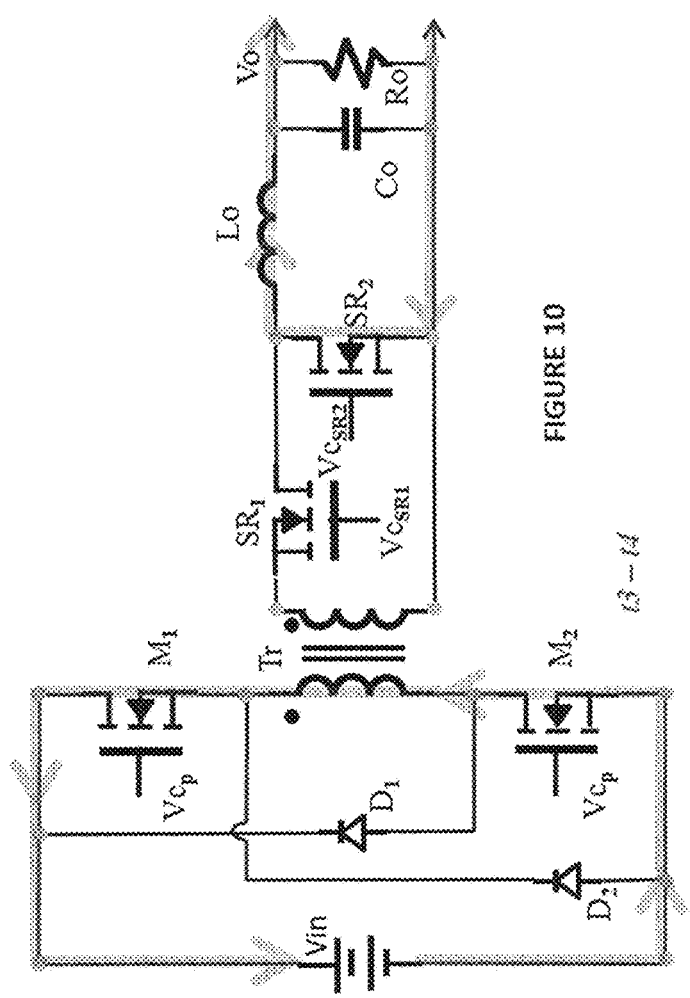
Figure 11:
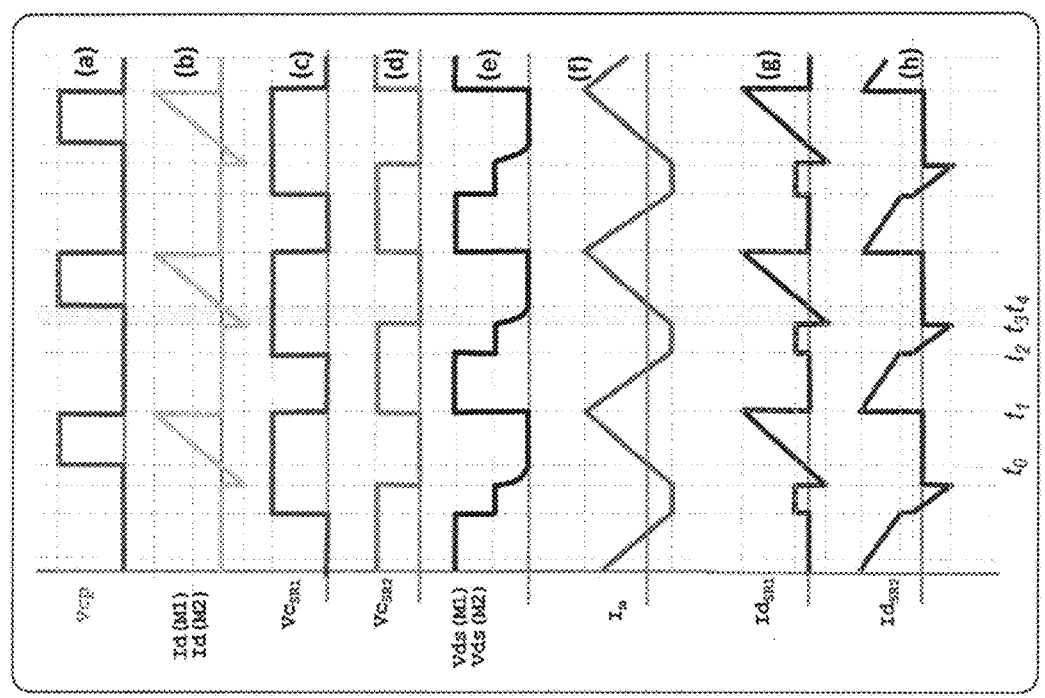

T1-T2. As depicted in FIG. 6 during this time period the transformer is resetting. D1 and D2 are conducting and the input voltage Vin is applied across the primary transformer in opposite polarity. In the secondary winding, a voltage is developed with the negative polarity at the dot. SR1 is not conducting. SR2 is conducting and the current flows through Lo towards the load. During this time interval, the energy stored in Lo during T0-T1 is transferred to the load.

Figure 1:
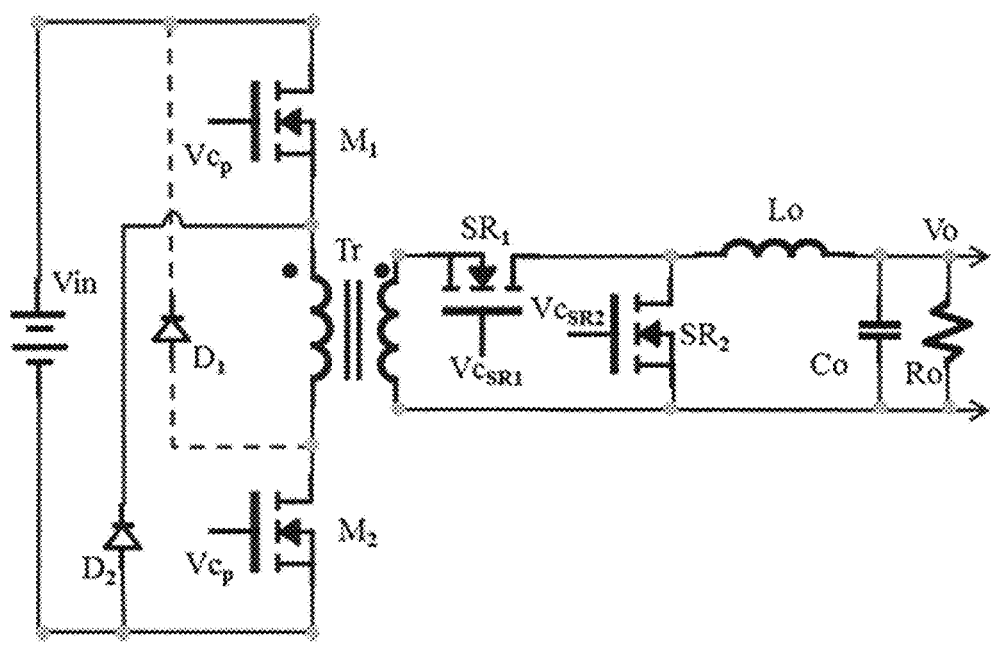
FIG. 1 shows a Two Transistor Forward topology.
Figure 2:
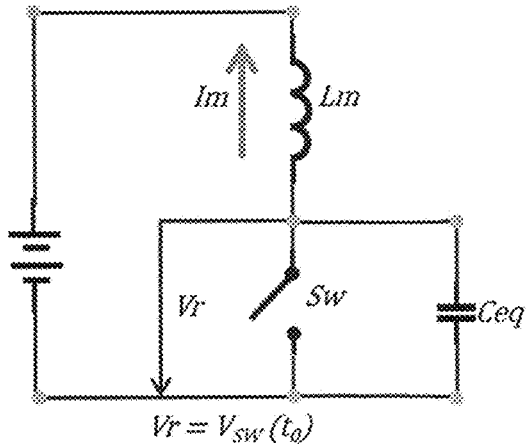
FIG. 2 shows an equivalent circuit for the two transistor forward topology, and the equations which describe the behavior of that equivalent circuit, and referred in this application as Resonant Circuit with Initial Conditions, are presented in FIGS. 2a, b, c, d, and e.

T2-T3. At the end of Reset Time, T2, the energy stored in the parasitic capacitance of the M1 and M2 as depicted in FIG. 8B and FIG. 8C is transferred towards the input source in a quasi-resonant transition as presented in FIG. 2 and FIG. 3. The magnetizing current is built up from zero to the level presented in FIG. 3e. During the resonant transition, the voltage across the transformer reached zero level wherein the voltage across each switch is equal to half of the input voltage. The resonant transition would further continue discharging the parasitic capacitance of M1 and M2 towards zero but the body diode of SR1 starts conducting and the magnetizing current is diverted into the secondary as presented in FIG. 8a. During this time interval, the secondary winding it is shorted and the magnetizing current amplitude will be preserved as can be seen in FIG. 9f. The current through SR2 is the summation of the magnetizing current flowing into the secondary via SR1 and the output current. In the event wherein the output current at t3 is zero, the current through SR2 is negative and its amplitude it is the magnetizing current.

T3-T4. At T3, the SR2 is turned off. When the current is flowing in reverse from the drain towards the source, the current flowing through SR2 will be diverted towards the primary winding of the transformer and start discharging the parasitic capacitance of M1 and M2 towards zero. In the event the current through Lo is zero at T3, the amplitude of the current reflected in the primary will be theoretically enough to discharge the parasitic capacitances to zero. If the current through Lo will be higher than zero the reflected current to the primary will not be enough to have a transition to zero voltage across M1 and M2. In the event the current through Lo at T3 is negative then the current reflected to the primary at the time when the SR2 is turn off will discharge the parasitic capacitance of M1 and M2 to zero and the discharge time will be lower.

In conclusion, to obtain zero voltage switching across M1 and M2 the current flowing through Lo at T3 shall be zero or negative. To maintain zero voltage switching condition across M1 and M2 at any load conditions and to prevent a very large ripple current through Lo, a slight modulation in frequency is necessary. This can be optimized by using a digital controller (e.g. as shown in the circuit of FIG. 4}. For example at very heavy loads, the frequency of operation will be decreased. At lighter loading conditions, the frequency will be increased. The frequency of operation and the dead time between the turn of SR2 and the turn on of M1 can be tailored over the entire operating conditions for optimum efficiency.

Figure 12:
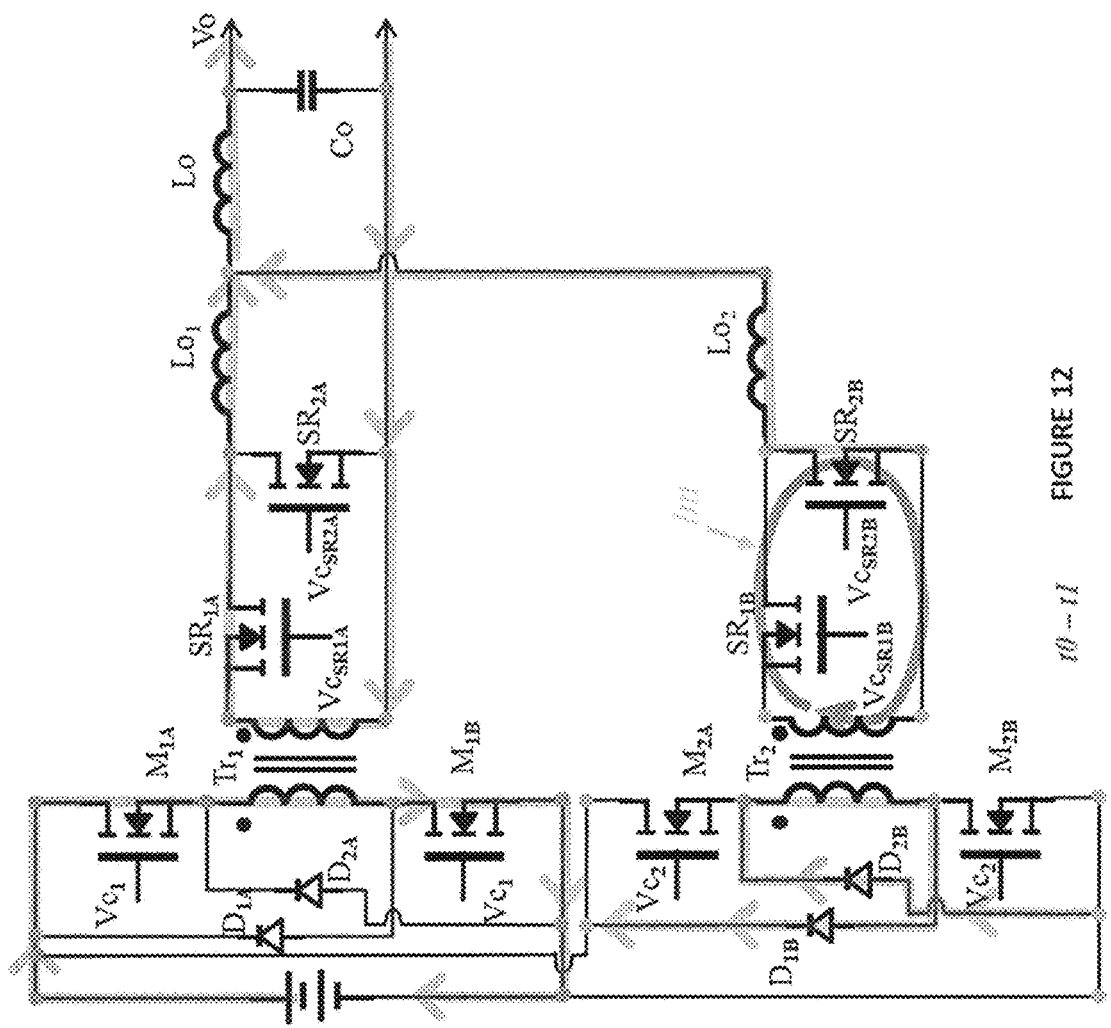
FIG. 12 shows another embodiment, with interleaving two power trains of two transistor forward converters, according to the principles of the present invention.
Figure 13:
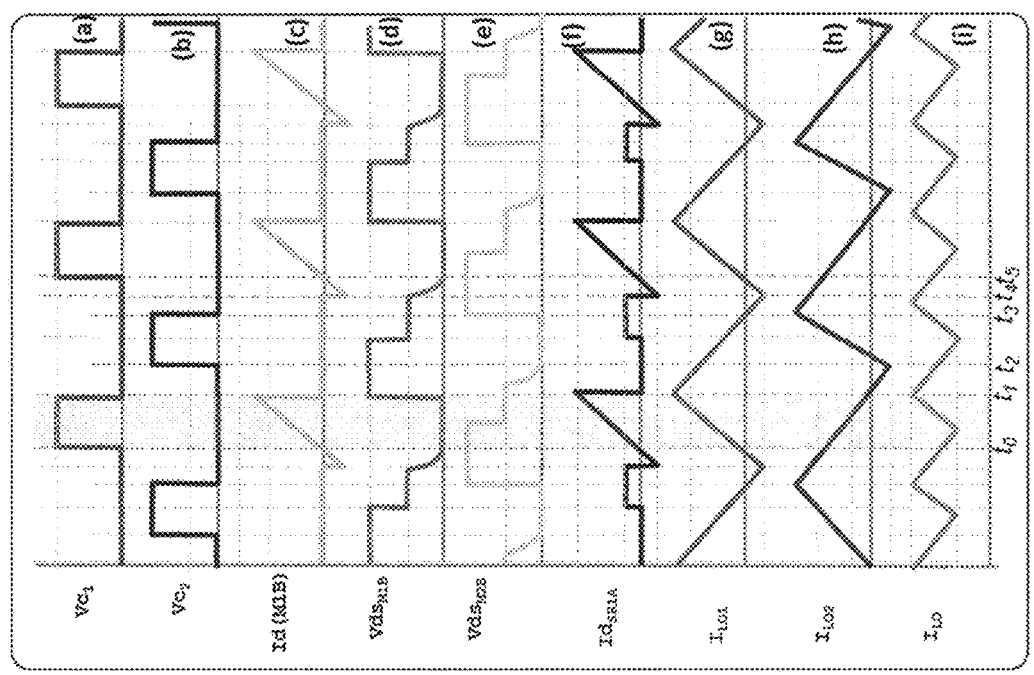
FIG. 13 shows key waveforms for a two transistor forward converter of FIG. 12, according to the principles of the present invention.

In another embodiment of this invention, we eliminated the need of a very large current ripple through the output inductor. In this new concept, we are interleaving two power trains of two transistor forward converters as depicted in FIG. 12. Besides the output inductor, Lo we are adding two small inductors Lo1 and Lo2. These two smaller inductors will have a larger current ripple and the larger output inductor Lo will have a small current ripple. The key waveforms are depicted in FIG. 13. The control for the primary switchers of the first power train is depicted in FIG. 13a. The control for the second power train is depicted in FIG. 13b. The current through primary switching elements are presented in FIG. 13c. In FIG. 13d is depicted the voltage across M1b and in FIG. 13e is depicted the voltage across M2B. In FIG. 13f is presented the current through SR1A. The current through Lo1 is presented in FIG. 13g. The current through Lo2 is depicted in FIG. 13j. The current through the output inductor Lo is depicted in FIG. 13l.

We have identified five modes of operation of this embodiment.

To-T1. As is depicted in FIG. 12 during this time M1A and M2B are conducting. The input voltage Vin is applied to the primary winding of Tr1. In a secondary winding of Tr1 a voltage is developed with the positive polarity at the dot. The current flows in the secondary via SR1A and Lo1 and Lo towards the load. There is another current flowing through Lo2 and SR2B towards the load as well. During this time SR1A is ON. The magnetizing current of Tr1 is built up through the transformer Tr1. This is the time interval wherein the energy is transferred to the secondary and in the same time energy is store in the output inductor Lo1 and Lo.

Figure 14:
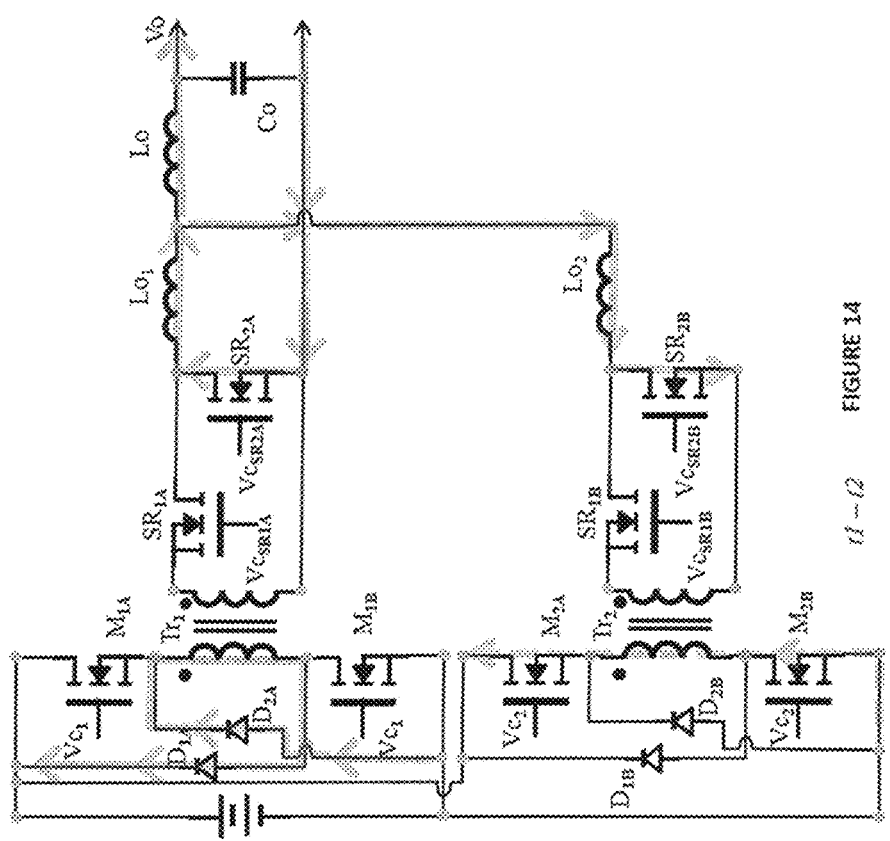
FIG. 14 shows the manner in which the primary switchers of the embodiment of FIG. 12 are turned off and the reset cycle starts through D1A and D2A when Vin is applied across the primary transformer Tr1 in opposite polarity, according to the principles of the present invention.

T1-T2. As depicted in FIG. 14 the primary switchers are turn off and the reset cycle starts through D1A and D2A when Vin is applied across the primary transformer Tr1 in opposite polarity. In the secondary winding of Tr1 a voltage is developed with the negative polarity at the dot. SR1A is off and SR2 is conducting and the current flows through Lo1 and Lo2 towards the load. During this time, the current through Lo2 is flowing in reverse. When SR2B is turned off the current will be transferred back to the primary discharging the parasitic capacitance of M2A and M2B towards zero.

Figure 15:
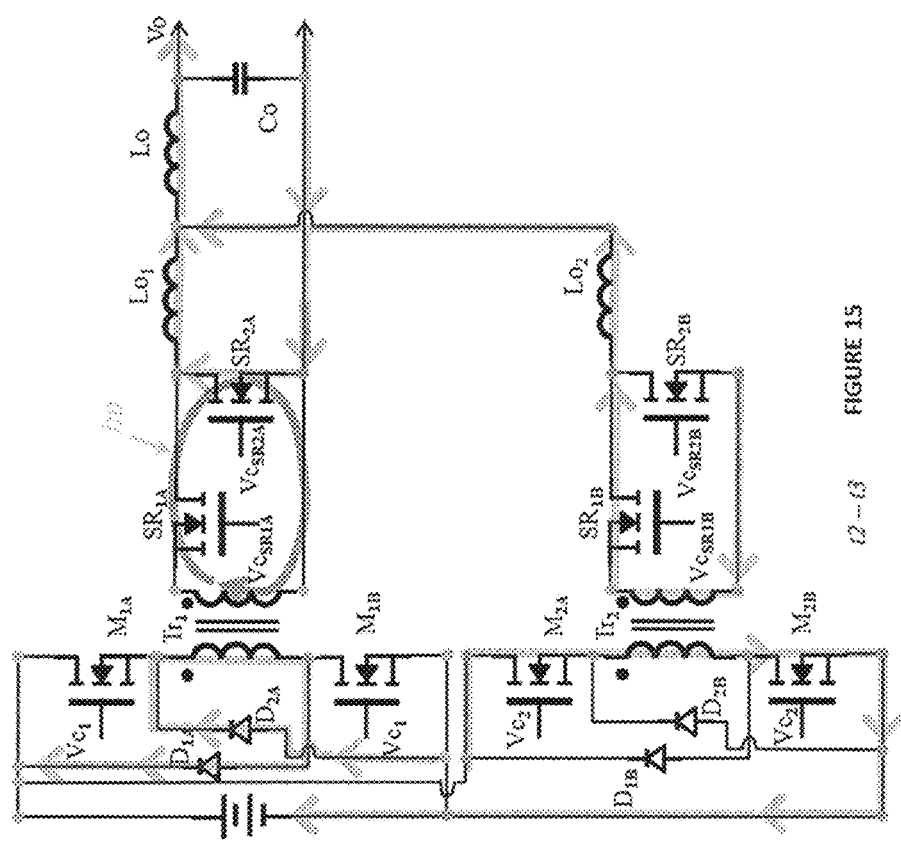
FIGS. 15-17 show the circuit of FIG. 12, during the time intervals t2-t3, t3-t4 and t4-t5, respectively.

FIG. 15 shows the circuit during time interval T2-T3. During this time interval TR1 it is still in the Reset Time and starts its dead time. During the dead time the magnetizing current in Tr1 flows into the secondary via SR1A and SR2A. The current continues to flow through Lo1, Lo and SR2A towards the load.

During this time interval, M2A and M2B are turned on. The input voltage Vin is applied to the primary winding of Tr2. A voltage is developed in the secondary winding and SR1B is on. The current flows through SR1B through Lo2 and Lo.

Figure 16:
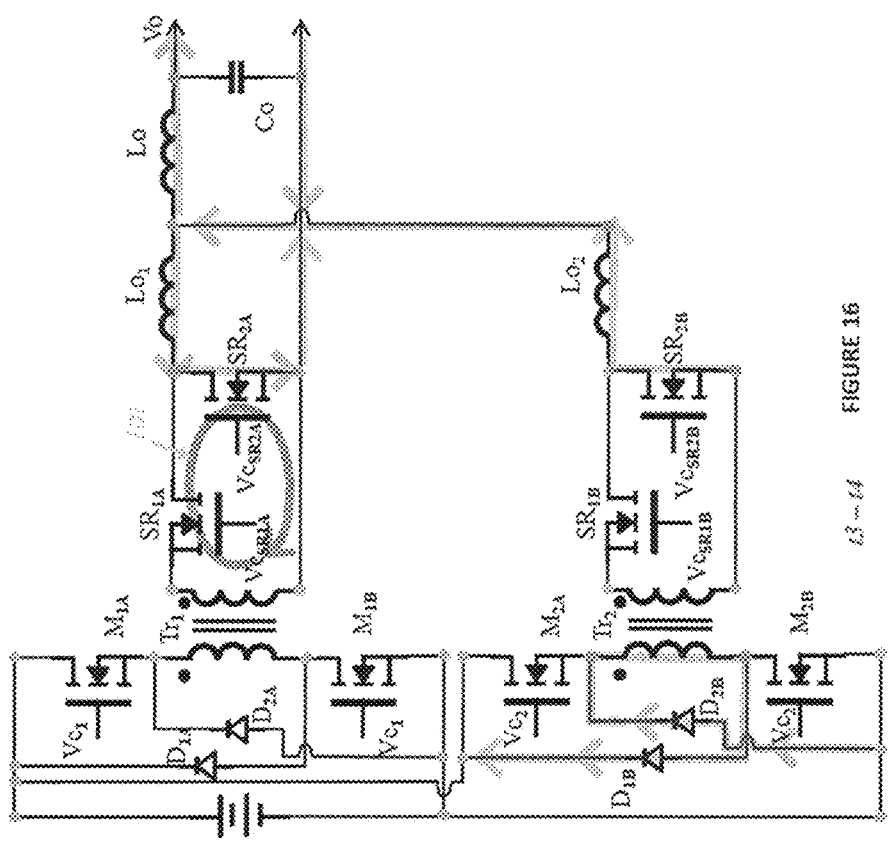

FIG. 16 shows the circuit during the time interval T3-T4. During this time interval TR1 it is still in the Reset Time and starts its dead time. During the dead time the magnetizing current in Tr1 flows into the secondary via SR1A and SR2A. The current continues to flow through Lo1, Lo and SR2A towards the load. In the upper power train, Tr1 ended the reset cycle and it is in the dead time period. The magnetizing current is flowing into the secondary winding through SR1A and SR2A. The current through Lo1 has changed its polarity flowing through SR2A from drain to the source. In the lower power train the current the transformer Tr2, it is in the reset cycle. The current continues to flow through SR2B and Lo2 as depicted in FIG. 16.

Figure 17:
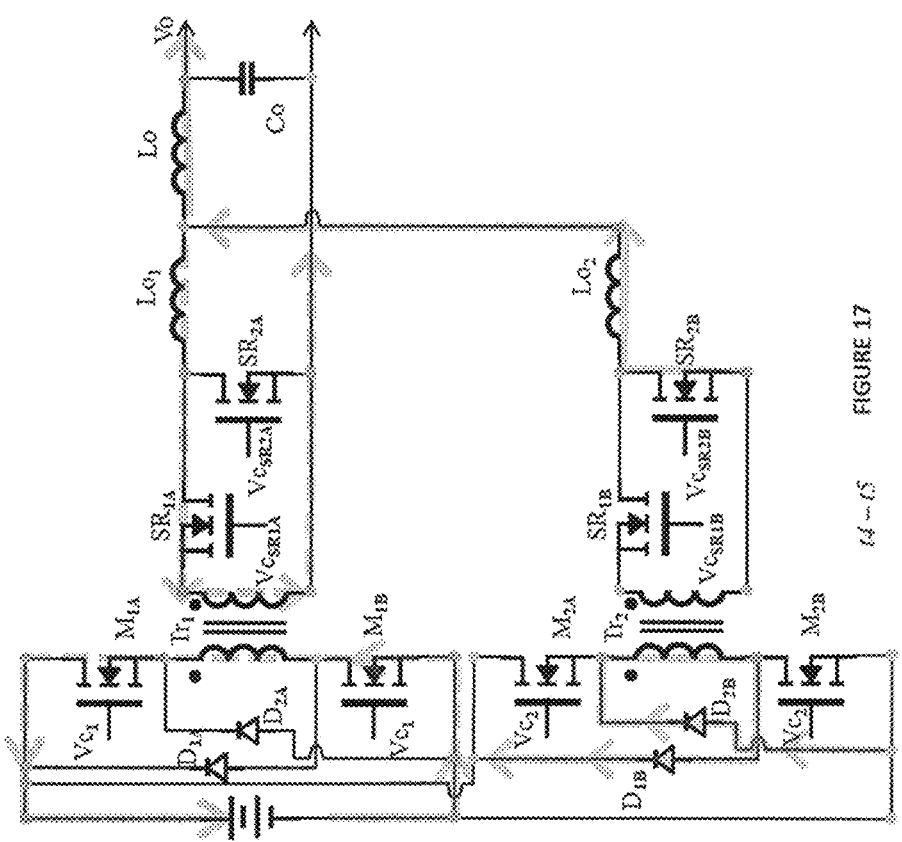

FIG. 17 shows the circuit during the time internal T4-T5. At T4 SR2A is turned off and the current flowing through it is transferred to the primary to discharge the parasitic capacitance of M1A and M1B towards zero. In the lower power train, the reset cycle of Tr2 is continuing via D1B and D2B. The current continues to flow though SR2B and Lo2.

In conclusion, in the foregoing embodiment of the invention the current through Lo has a low ripple. By interleaving the power trains, we create high current ripple through Lo1 and Lo2, which create a negative current through SR2A and SR2B before SR2A, and SR2B turns off. When SR2A and SR2B are turned off the negative current is transferred to the primary to obtain soft commutation on the primary switchers.

Figure 18:
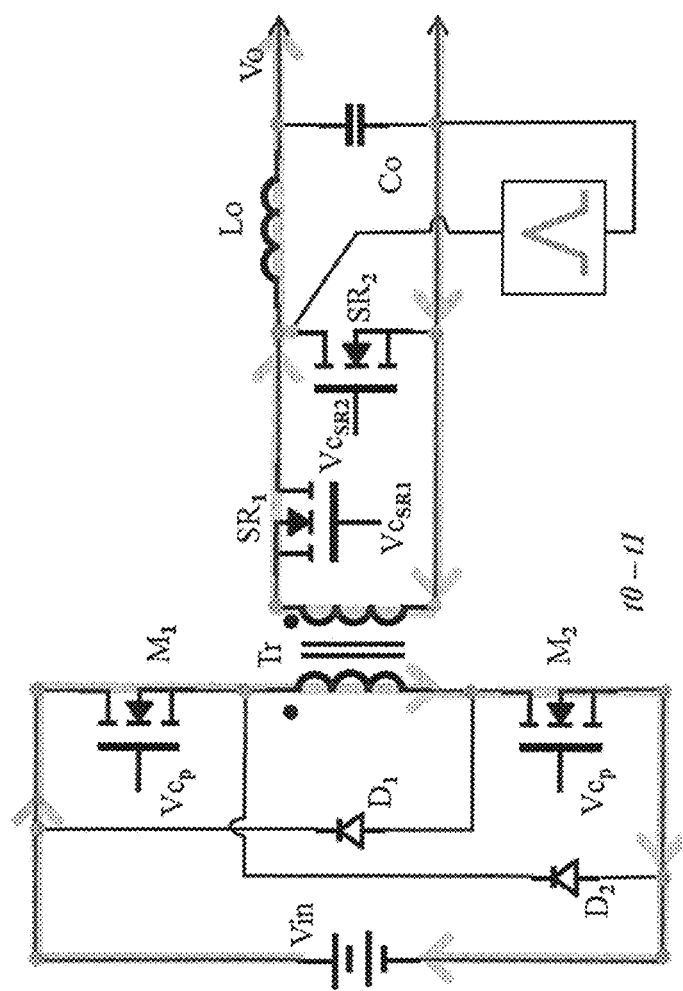
FIG. 18 shows still another embodiment.
Figure 19:
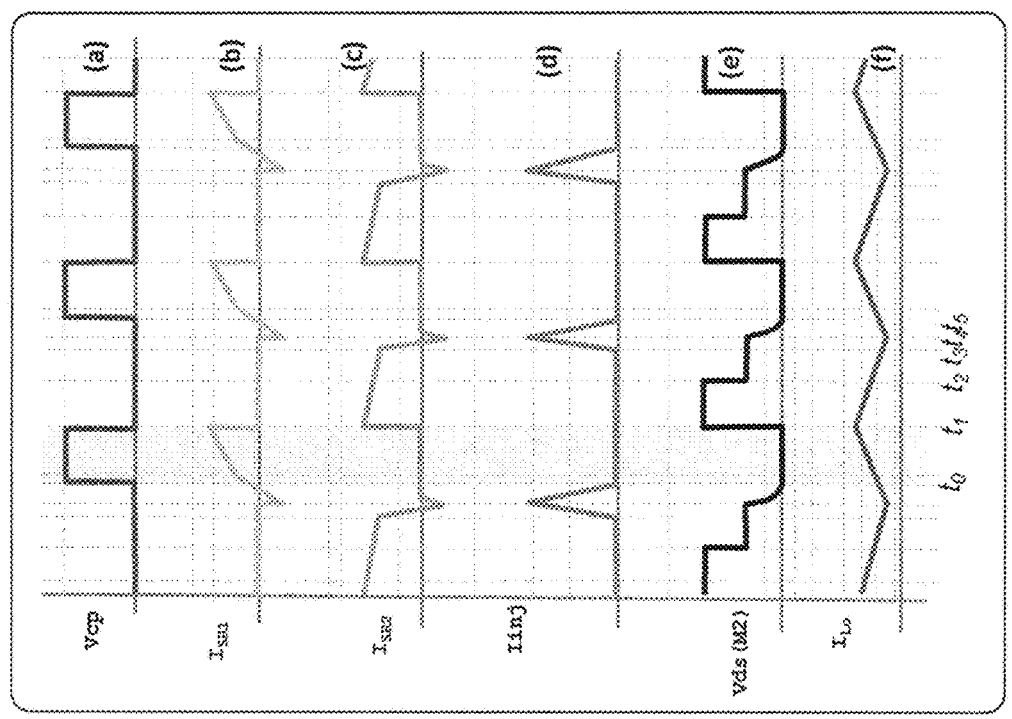
FIG. 19 shows waveforms for the circuit of FIG. 18.

The third embodiment of this invention is described in FIG. 18. In this embodiment, we are using a current source, which injects a narrow pulse of current across SR2. The current source can have any shape though we used be triangular, rectangular or half-sinusoidal. The goal for the current source is to be larger than the current flowing through SR2 before the M1 and M2 are turned on. The key waveforms are depicted in FIG. 19. The drive signal for the primary switchers is depicted in FIG. 19a. The current through M1 and M2 is depicted in FIG. 19b. The current through SR2 is depicted in FIG. 19c. The current injection is depicted in FIG. 10d. The voltage across M1 and M2 is depicted in FIG. 19e. The output current is depicted in FIG. 19f.

We identified five modes of operation of this embodiment.

To-T1 (FIG. 18). During this time, M1 and M2 are on and the input voltage is applied to the primary. A voltage is produced into the secondary winding with the polarity at the dot. SR1 is conducting and the current is flowing through Lo to the output. FIG. 19 shows the waveforms.

Figure 20:
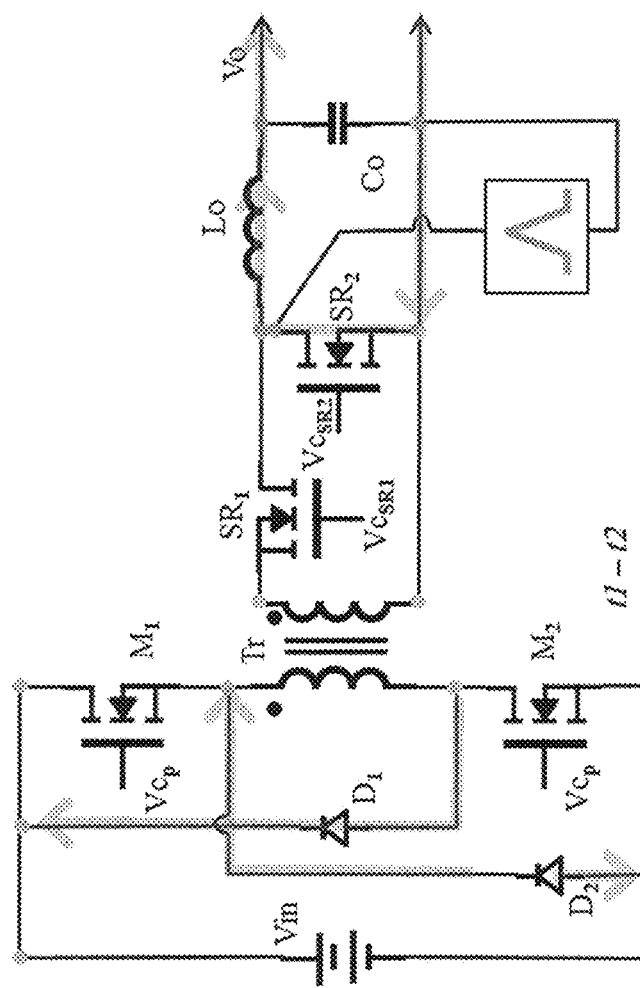
FIGS. 20-23 show the circuit of FIG. 18, during the time intervalst1-t2, t2-t3, t3-t4 and t4-t5, respectively.

T1-T2 (FIG. 20). After the primary switchers turn off the magnetizing current in the transformer turns on D1 and D2 starting the rest cycle. The output current is flowing through SR2 and Lo to the load.

Figure 21:
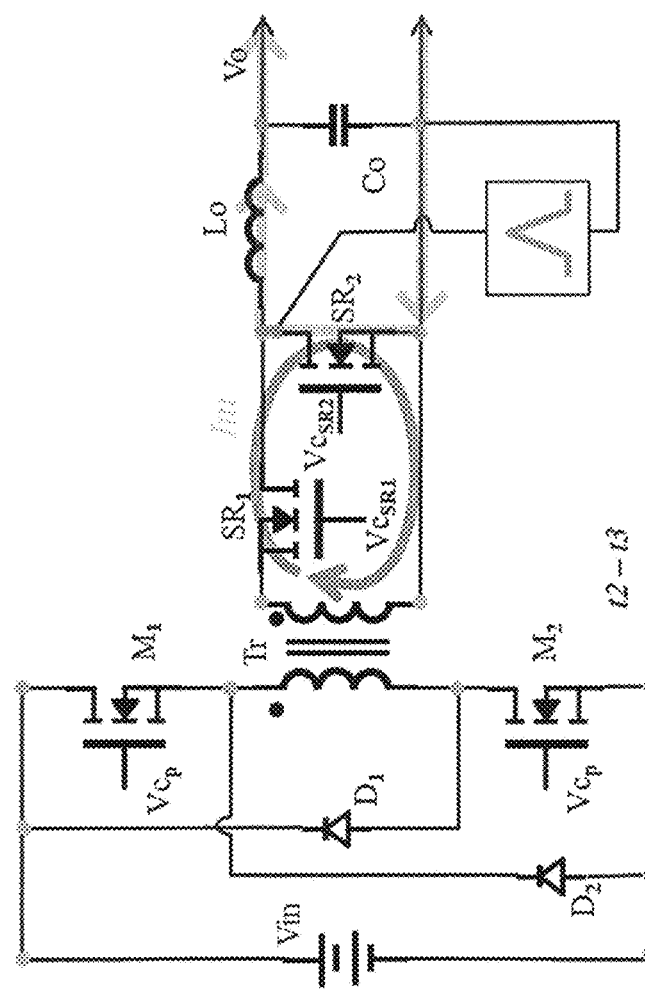

T2-T3 (FIG. 21). During this time, the magnetizing current is shorted in the secondary by the conduction SR1. The output current is flowing further through Lo and SR2.

Figure 22:
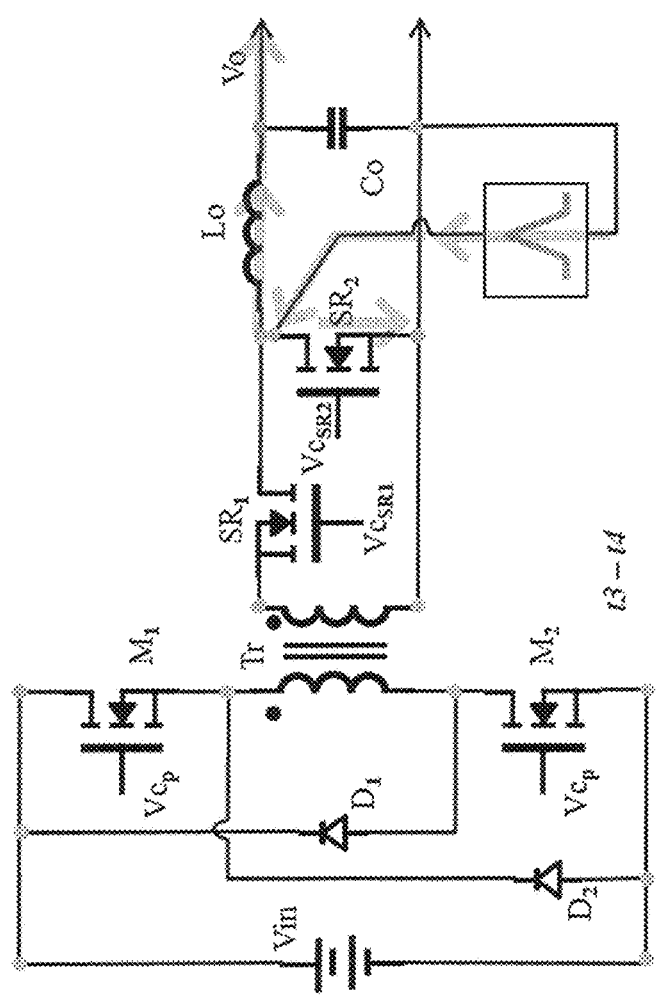

T3-T4 (FIG. 22). The current source is activated and the current Iinj is larger than the output current. The current reverses through Sr2.

Figure 23:
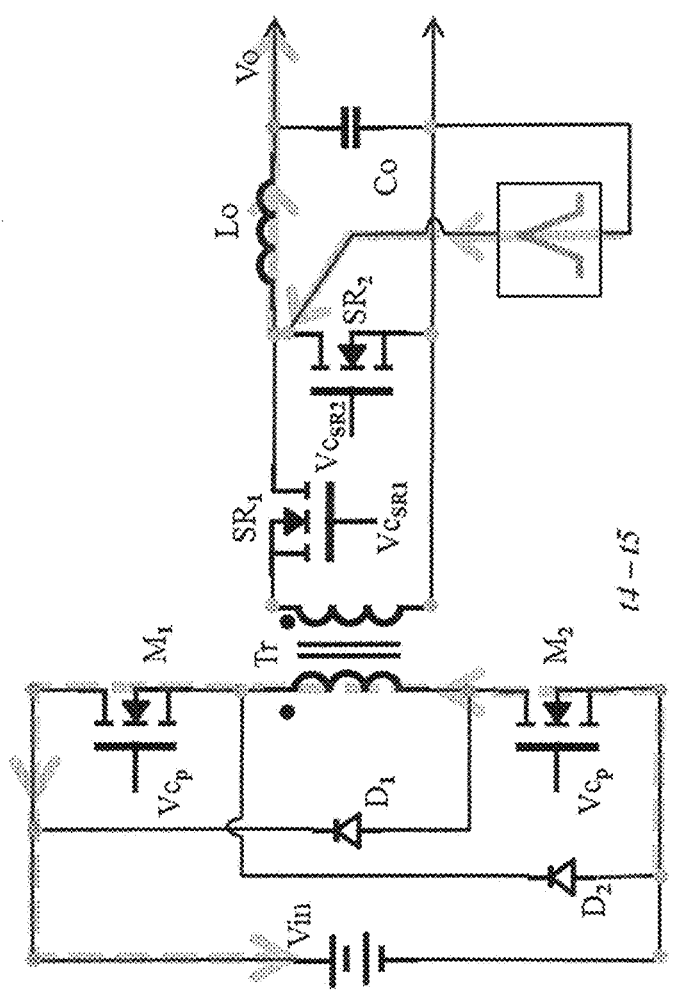

T4-T5 (FIG. 23). The excess current from the Iinj and the output current reflects in the primary and discharges the parasitic capacitance towards zero.

These embodiments of this invention can be applied to any forward converter. For optimum operation, the transformers used in these converters should have a low leakage inductance. Except for the case of current injection in order to create ideal conditions during the ZVS phase of the primary switches and prevent reverse recovery in the synchronous rectifiers, a controller has to be used that predicts or calculates the condition in the output inductor and magnetizing current in the transformer based on load and line. This calculation can also be pre-computed by a computer and stored as a table in a less sophisticated micro-computer that is part of the converter control (to reduce the size or cost of the controller). As part of this optimization the frequency of operation of the converter is determined.

Thus, the present invention provides a resonant transition control method that shorts the output winding of a forward converter by using output synchronous rectifiers to delay the natural ringing transition in a discontinuous mode forward converter. The method is particularly useful for the purpose of reducing turn on losses. Also, the present invention provides a resonant transition control method that involves interleaving two power trains to create a negative current through the freewheeling synchronous rectifiers to minimize the turn on losses. Still further, the present invention provides a resonant transition control method that utilizes a current source to inject a current through a synchronous rectifier for the purpose of creating a negative current before the synchronous rectifier is turned off.

In addition, it will be apparent that the present invention provides a method to improve any forward topology operation to achieve efficient resonant transitions by actively shorting the magnetizing inductance and release the short at another time thus producing lower switching losses independent of frequency. In another embodiment of this invention the current from the output inductor is allowed to go negative before the freewheeling synchronous rectifier is turned off, pushing the current back into the primary to create a soft transition across the switching elements before they are turned on. In another embodiment of the invention a current source is used to inject a negative current through the freewheeling synchronous rectifier before is turned off with the purpose of transferring the current into the primary to discharge the parasitic capacitances of the primary switchers before are turned on. An optimized control method can be utilized to tailor the frequency to create the necessary conditions requested by the embodiments of the invention.

The invention claimed is:

1. A resonant transition control method for a forward converter having a transformer, primary switching elements, and reset rectifiers in a primary and synchronous rectifiers and an output inductor in a secondary, the method comprising shorting a secondary winding of the transformer during the natural ringing of the transformer, to conserve magnetizing energy stored in the transformer, while magnetizing current exceeds a value of output inductor current prior to the primary switching elements turn on, to turn the primary switching elements on at zero voltage or near zero voltage.

2. The method of claim 1, including: adjusting frequency and turn on duration of the primary switching elements so that the conditions of claim 1 are satisfied for a range of line and load conditions.

3. The method of claim 2, wherein the method is practiced on a two transistor forward converter.

4. A resonant transition control method for a forward converter that has two power trains each of which has a freewheeling rectifier, the method comprising:
   interleaving the two power trains so that each power train in forward mode provides current to another power train, so that a corresponding freewheeling synchronous rectifier has negative current, to create negative current through the freewheeling synchronous rectifiers of the converter to minimize turn on losses in the primary switching elements.

5. The method of claim 4, including:
   adjusting frequency and turn on duration of the primary switching elements so that conditions of claim 4 are satisfied for a range of line and load conditions.

6. The method of claim 4, wherein the method is practiced on a two transistor forward converter.

7. A resonant transition control method for a forward converter, the method comprising:
   utilizing a current source to inject current into a synchronous rectifier in a secondary of the forward converter to create negative current in synchronous rectifiers in the secondary before that synchronous rectifier is turned off, to turn primary switching elements of the forward converter on at zero or near zero voltage.

8. The method of claim 7, including:
   adjusting an amplitude of current injected into the synchronous rectifiers in the secondary, to satisfy conditions of claim 7 for a range of line and load conditions.

9. The method of claim 7, including:
   adjusting frequency and turn on duration of the primary switching elements to satisfy conditions of claim 7 for a range of line and load conditions.

10. The method of claim 7, wherein the method is practiced with a two transistor forward converter.

\* \* \* \* \*